United States Patent
Henry, III et al.

(10) Patent No.: US 6,843,472 B2
(45) Date of Patent: Jan. 18, 2005

(54) UPPER SHOCK MOUNT ISOLATOR WITH INTEGRAL AIR SPRING HOUSING PIVOT BEARING

(75) Inventors: Harold H. Henry, III, Huron, OH (US); Steven O. Luzsicza, Huron, OH (US); David Steed, Perrysburg, OH (US); Karl Kazmirski, Toledo, OH (US); Gary Groves, Toledo, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 10/348,125

(22) Filed: Jan. 21, 2003

(65) Prior Publication Data

US 2004/0140601 A1 Jul. 22, 2004

(51) Int. Cl.[7] .................................................. F16F 9/04
(52) U.S. Cl. ................................................... 267/64.24
(58) Field of Search ........................ 267/64.24, 64.21, 267/64.23, 64.27, 64.26, 64.19, 122

(56) References Cited

U.S. PATENT DOCUMENTS

| 2,856,198 | A |   | 10/1958 | Muller |   |
|---|---|---|---|---|---|
| 3,347,541 | A |   | 10/1967 | Buccino |   |
| 3,351,336 | A |   | 11/1967 | Blake |   |
| 3,947,077 | A |   | 3/1976 | Berg et al. |   |
| 4,175,770 | A |   | 11/1979 | Draisbach et al. |   |
| 4,256,292 | A |   | 3/1981 | Sullivan, Jr. et al. |   |
| 4,325,541 | A | * | 4/1982 | Korosladanyi et al. | 267/64.21 |
| 4,588,171 | A | * | 5/1986 | Stephens | 267/64.24 |
| 4,594,009 | A |   | 6/1986 | Gutris |   |
| 4,779,855 | A |   | 10/1988 | Tanaka |   |
| 4,981,287 | A |   | 1/1991 | Cothenet |   |
| 5,211,380 | A |   | 5/1993 | Germano |   |
| 5,405,199 | A |   | 4/1995 | Mabuchi et al. |   |
| 5,667,203 | A | * | 9/1997 | Romer | 267/64.23 |
| 5,795,092 | A |   | 8/1998 | Jaworski et al. |   |
| 5,823,306 | A |   | 10/1998 | de Molina |   |
| 5,890,705 | A |   | 4/1999 | Lee |   |
| 5,902,050 | A |   | 5/1999 | Balczun et al. |   |
| 5,924,528 | A |   | 7/1999 | Vermolen et al. |   |
| 5,947,459 | A |   | 9/1999 | Ducloux et al. |   |
| 6,168,143 | B1 | * | 1/2001 | Lambrecht et al. | 267/64.24 |
| 6,286,820 | B1 | * | 9/2001 | Raulf et al. | 267/64.21 |

* cited by examiner

*Primary Examiner*—Robert A. Siconolfi
*Assistant Examiner*—Melanie Torres
(74) *Attorney, Agent, or Firm*—Harness, Dickey & Pierce, PLC

(57) ABSTRACT

An upper mounting system for a MacPherson strut includes a shock absorber mount and an air spring mount. The air spring mount is disposed coaxially around the shock absorber mount. A curved spherical interface of the air spring mount permits pivotal movement of the air spring such that it maintains a coaxial relationship with the shock absorber. The curved spherical interface also provides a seal for sealing the gas chamber of the air spring.

19 Claims, 3 Drawing Sheets

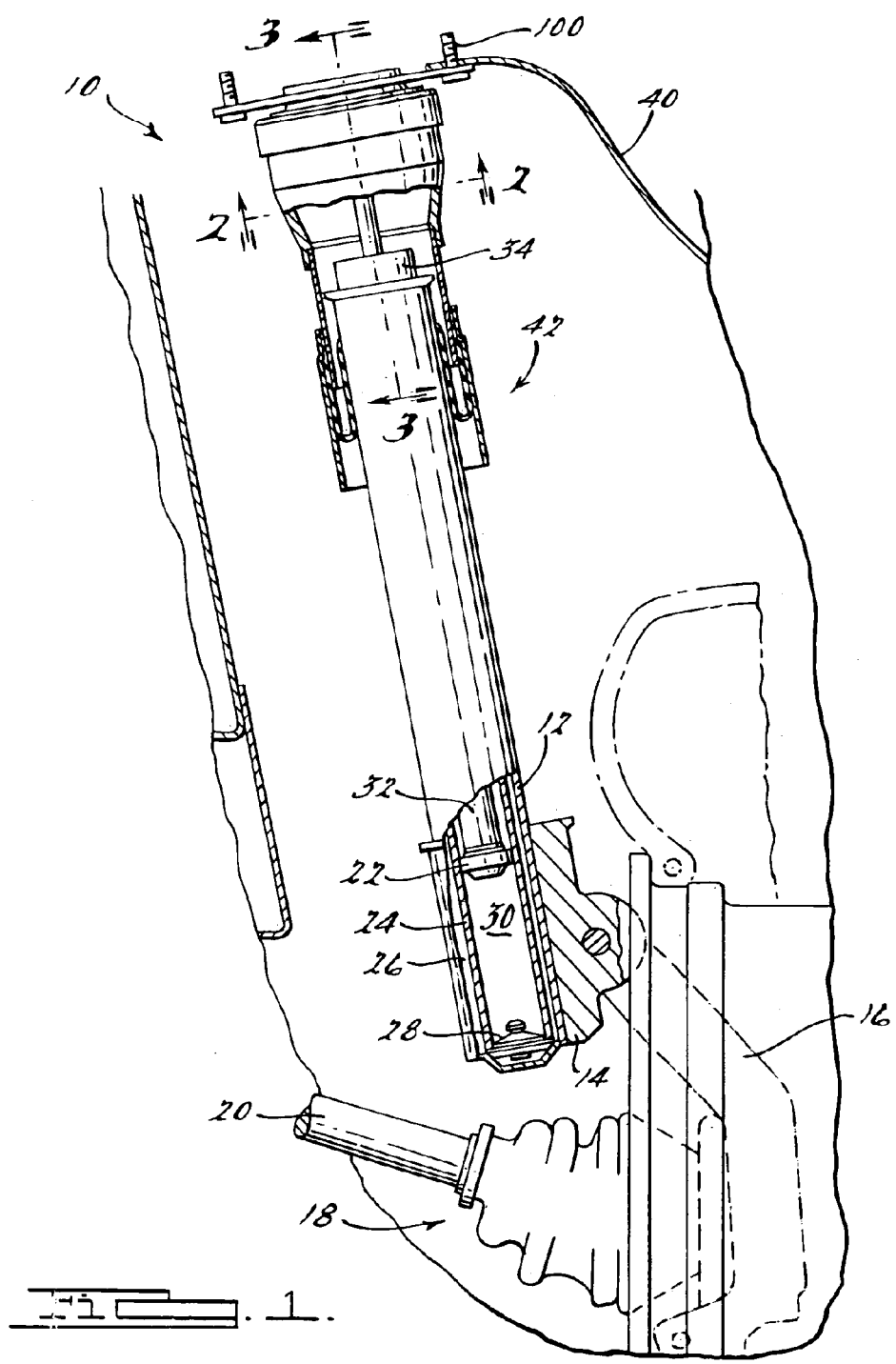

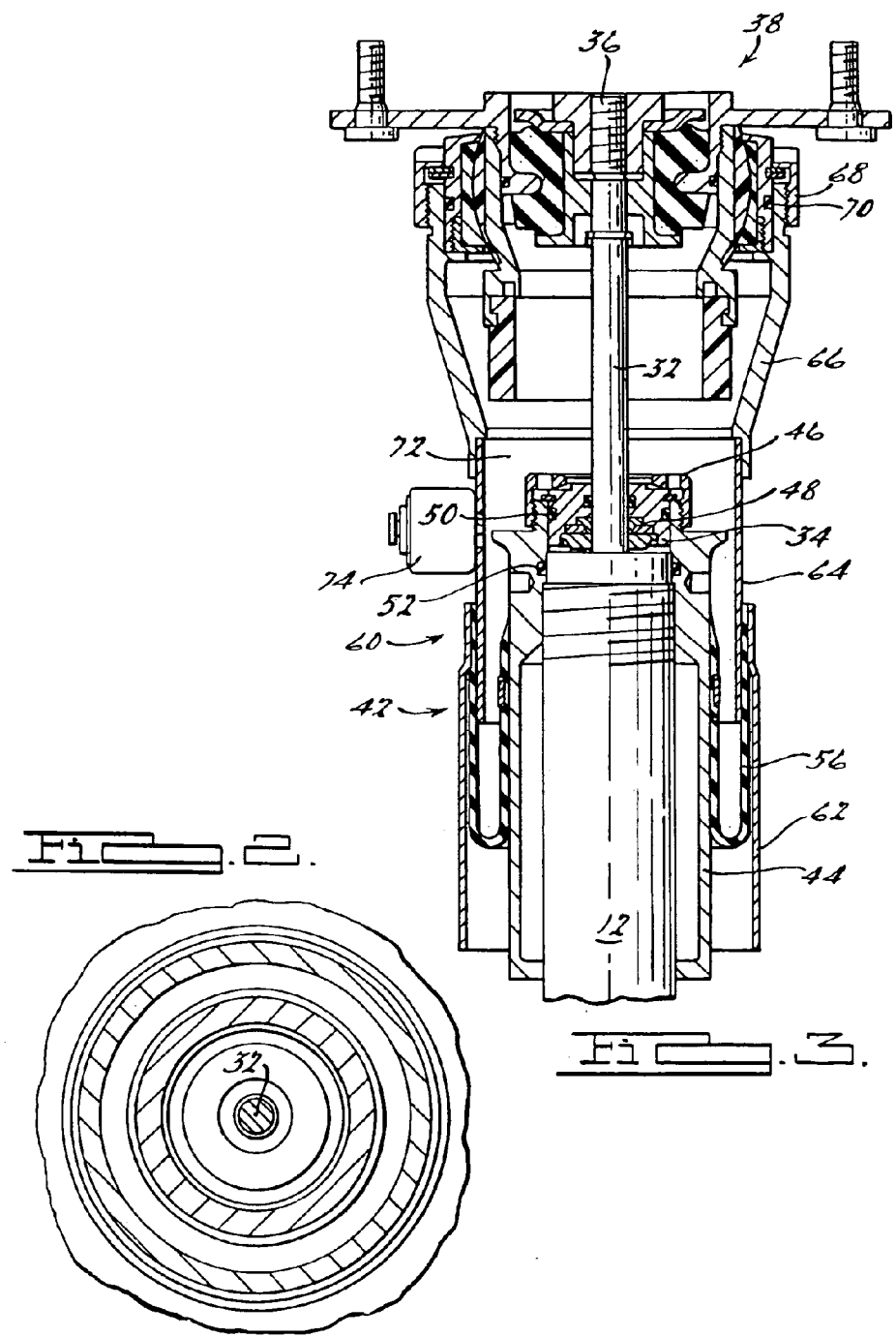

UPPER SHOCK MOUNT ISOLATOR WITH INTEGRAL AIR SPRING HOUSING PIVOT BEARING

FIELD OF THE INVENTION

The present invention relates to suspension struts for motor vehicles. More particularly, the present invention relates to an upper shock mounting system which isolates the strut from the vehicle and which includes an integral pivot bearing for the air spring of the vehicle.

BACKGROUND OF THE INVENTION

MacPherson struts are being employed in many present day and future vehicles. These struts comprise a combination wheel suspension strut and shock absorber which eliminates the requirement for an upper control arm. The elimination of the upper control arm provides an increase in space for the engine and the transmission or transaxle within the engine compartment of the vehicle. This additional space is especially advantageous for front wheel drive vehicles which include an Aeast-west≅ engine rather than the traditional Anorth-south≅ orientation for rear wheel drive vehicles.

A typical MacPherson strut includes the suspension spring positioned co-axially around the shock absorber. The spring extends from a bracket mounted on the outer tube of the shock absorber to a bracket that is integrated into the top mounting system for the MacPherson strut. The suspension spring can be a steel coil spring or the suspension spring can be an air spring.

When an air spring is used with the MacPherson strut, the air spring is positioned coaxially over the shock absorber assembly and it typically employs an air spring which is rigidly fixed to the vehicle body. The air spring is designed to be of a sufficient diameter to accommodate articulation of the shock absorber through the normal suspension jounce and rebound motion of the vehicle. The internal diameter of the air spring must therefore be large enough so as not to pinch the air spring bellows between the shock absorber body and the outer canister of the air spring, as the suspension is articulated. To reduce the required diameter of the air spring body, the upper portion of the air spring can be mounted to a spherical bearing. The spherical bearing will allow conical motion so that the air spring can articulate coaxially with the shock absorber. This coaxial movement reduces the diameter of the air spring because the outer canister of the air spring moves with the shock absorber rather than the shock absorber moving towards a stationary outer canister. In order to prevent air leakage of the air spring through the sliding surfaces of the spherical bearing, the sliding elements of the bearing are typically positioned external to the pressure chamber of the air spring.

While the addition of a spherical bearing allowing conical motion so that the air spring articulates coaxially with the shock absorber allows the diameter of the air spring to be reduced, the packaging space for both the upper shock isolator and the separate spherical bearing assembly is still generally unacceptably large. The spherical bearing assembly can be located axially above the air spring and the upper shock isolator assembly similar to a ball joint, but this configuration reduces the available length of the shock absorber which has the undesirable effect of reducing the allowable suspension travel. If the spherical bearing assembly is located external to the air spring canister and is generally in the same plane as the shock absorber isolator, the overall diameter of the upper mount assembly becomes unacceptably large.

The continued development of the MacPherson strut suspension systems includes the design and development of mounting systems which optimize the space required for the mounting system.

SUMMARY OF THE INVENTION

The present invention provides the art with an upper mounting system for a MacPherson strut which integrates the spherical bearing assembly, including the sliding surface, internally into the upper end of the air spring canister. This system allows the air spring to articulate coaxially with the shock absorber while allowing the diameter of the air spring body to be reduced. The reduction in diameter of the air spring body provides an acceptable package envelope for the upper mounting area of the air spring and the shock absorber assembly.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a side view, partially in cross section, of a front suspension system which incorporates the unique mounting system in accordance with the present invention;

FIG. 2 is an end view taken in the direction of Arrows 2—2 in FIG. 1.

FIG. 3 is an enlarged side view, partially in cross section, of the upper half of the strut illustrated in FIG. 1 taken in the direction of Arrows 3—3 in FIG. 1.

DETAILED DESCRIPTION OF THE PREFERRED EMBODIMENT

Figure 4:
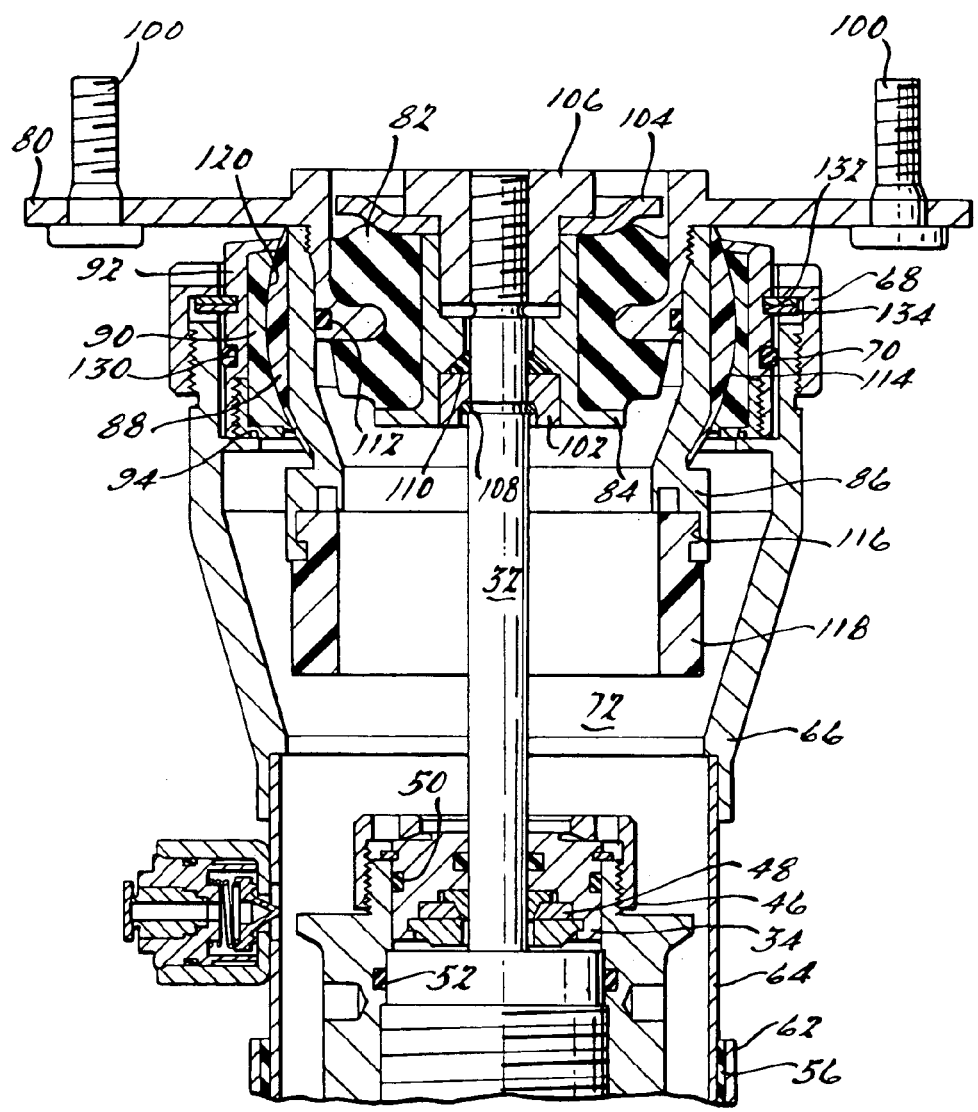
FIG. 4 is an enlarged side view, partially in cross section, of the unique mounting system illustrated in FIG. 1.

Referring now to the drawings in which like reference numerals designate like or corresponding parts throughout the several views, there is shown in FIG. 1 a MacPherson type suspension strut which incorporates the unique mounting system in accordance with the present invention and which is designated generally by the reference number 10. Strut 10 comprises an outer reservoir tube 12 supported at its lower end in a cup-like mounting bracket 14. Mounting bracket 14 is attached to a steering knuckle 16 of a steerable front road wheel assembly 18 driven by a rotatable half shaft 20. Secured within reservoir tube 12 is a hydraulic shock absorbing cartridge having a valved piston 22 mounted for reciprocating sliding movement in a pressure tube 24 radially spaced inwardly from reservoir tube 12 to provide a reservoir 26 for hydraulic damping fluid of the strut. A base valve 28 provides for the controlled hydraulic communication between reservoir 26 and a lower working chamber 30 formed by piston 22 and pressure tube 24. Piston 22 is connected to the lower end of a cylindrical piston rod 32 which extends axially and upwardly through an end cap 34.

Referring now to FIGS. 1–4, piston rod 32 has a reduced diameter and threaded end 36 for attachment to a shock absorber mount or suspension upper mounting system 38 that is in turn secured to a sheet metal tower 40 formed in the wheel well of the vehicle body. An air spring assembly 42 is mounted at one end to reservoir tube 12 and at its opposite end to upper mounting system 38.

Air spring assembly 42 includes an inner canister 44 threadingly received on reservoir tube 12 and an upper cap 46 which is threadingly secured to inner canister 44. Upper cap 46 retains end cap 34 within inner canister 44. A group of seals 48 seal the interface between piston rod 32 and end cap 34, a seal 50 seals the interface between end cap 34 and inner canister 44 and a seal 52 seals the interface between reservoir tube 12 and inner canister 44.

An air spring bellows 56 is sealingly attached at one end to inner canister 44 using a retaining ring. The opposite end of air spring bellows 56 is secured to an outer canister assembly 60. Outer canister assembly 60 includes a lower canister 62, an intermediate canister 64, an upper canister 66 and a retaining cap 68. Air spring bellows 56 is sandwiched between lower canister 62 and intermediate canister 64 which functions to sealingly retain air spring bellows 56. Intermediate canister 64 is sealingly secured to upper canister 66 and upper canister 66 is secured to upper mounting system 38 using retaining cap 68. A seal 70 seals the interface between upper canister 66 and upper mounting system 38.

Upper mounting system 38, air spring assembly 42 and end cap 34 define a sealed chamber 72 within which pressurized air functions as a spring to support the sprung portion of the vehicle. A valve 74 extending through intermediate canister 64 allows for the control of pressure within chamber 72 to control the height of the vehicle and/or the amount of air within chamber 72.

Upper mounting system 38 comprises an outer tube 80, an elastomeric bushing 82, an inner tube 84, a bearing inner tube 86, a plastic journal 88, an elastomeric bushing 90, a grooved bearing outer tube 92 and an end ring 94. Outer tube 80 is preferably made of aluminum and it includes a generally planar section which locates three mounting studs 100 which are utilized in mounting upper mounting system 38 to sheet metal tower 40. Elastomeric bushing 82 is bonded to a central cylindrical section of outer tube 80 on its exterior surface and it is bonded to inner tube 84 on its inner surface. Inner tube 84 is also preferably made from aluminum.

Piston rod 32 extends through inner tube 84 with a washer 102 being located at the lower end of inner tube 84 and a washer 104 and a nut 106 being located at the upper end of inner tube 84. Washer 102 is sandwiched between inner tube 84 and a retaining ring 108 disposed in a groove on piston rod 32. Washer 102 and retaining ring 108 provide a reaction point for the tightening of nut 106. A seal 110 is located between inner tube 84, washer 102 and piston rod 32 to seal chamber 72. Washer 104 is placed over piston rod 32, inner tube 84 and elastomeric bushing 82 and the assembly of piston rod 32 to upper mounting system 38 is maintained by nut 106 being threadingly received and tightened onto the shredded end of piston rod 32.

Bearing inner tube 86 is preferably made from aluminum and it is threadingly received by the outer surface of the central cylindrical section of outer tube 80. A seal 112 seals the interface between bearing inner tube 86 and outer tube 80. Prior to being secured to outer tube 80, plastic journal 88 is molded to the outer surface of bearing inner tube 86. Plastic journal 88 includes a first generally spherical surface 114 which is one of the curved interfaces provided for the sliding or pivotal movement of upper mounting system 38. The lower portion of bearing inner tube 86 defines a grooved surface 116 which is utilized to mount a jounce bumper 118.

Elastomeric bushing 90, a self lubricated elastomer, is snap fitted over plastic journal 88 and it defines a second generally spherical surface 120 which is another of the curved interfaces provided for the sliding or pivotal movement of upper mounting system 38. Bearing outer tube 92, preferably made from aluminum, is assembled over elastomeric bushing 90 and end ring 94, preferably made from aluminum, is threadingly received by outer tube 92 to complete the assembly. The assembly of bearing inner tube 86, plastic journal 88, elastomeric bushing 90, bearing outer tube 92 and end ring 94 form an air spring mount and are all completed prior to bearing inner tube 86 being assembled to outer tube 80. End ring 94 is threaded into bearing outer tube 92 and it controls the compression of elastomeric bushing 90. The compression of bushing 90 is sufficient to seal pressure seal chamber 72 while still allowing air spring assembly 42 to articulate coaxially with the shock absorber. This compression of bushing 90 is also sufficient to prevent contaminants from entering the bearing sliding interface from the top side making external sealing of the bearing interface unnecessarily.

The exterior surface bearing outer tube 92 includes a groove 130 which positions seal 70 and a groove 132 which positions snap rings 134 which provide a reaction point for retaining cap 68.

Thus, upper mounting system 38 mounts both piston rod 32 of the shock absorber and air spring assembly 42 to the vehicle while allowing for the coaxial movement of air spring assembly 42 with the shock absorber. Mounting system 38 provides both a decreased package size and a weight reduction when compared to previously existing methods of allowing coaxial articulation of an air spring over a shock absorber assembly. The inclusion of a bearing internally to the pressure chamber allows for a smaller diameter and lighter air spring outer canister while not resulting in an undesirably large diameter and heavy upper mounting system. Elastomeric bushing 90 yields acceptable conical breakaway characteristics to allow the air spring canisters to articulate so as not to pinch air spring bellows 56, but also elastomeric bushing 90 can be sufficiently compressed in the assembly onto plastic journal 88 so as to form a pressure seal from chamber 72.

While the above detailed description describes the preferred embodiment of the present invention, it should be understood that the present invention is susceptible to modification, variation and alteration without deviating from the scope and fair meaning of the subjoined claims.

What is claimed is:

1. A suspension mounting system for a vehicle, said mounting system comprising:
    a shock absorber;
    a shock absorber mount adapted to secure said shock absorber to said vehicle;
    an air spring disposed around said shock absorber, said air spring defining a sealed chamber; and
    an air spring mount disposed around said shock absorber mount, said air spring mount and said shock absorber mount defining said sealed chamber; wherein:
    said air spring mount provides pivotal movement with respect to said shock absorber mount; and
    said air spring mount includes a first and a second curved surface for providing said pivotal movement.

2. The suspension mounting system according to claim 1, wherein said first and second curved surfaces are generally spherical.

3. The suspension mounting system according to claim 2, wherein said second curved surface sealingly engages said first curved surface.

4. The suspension mounting system according to claim 1, wherein said second curved surface sealingly engages said first curved surface.

5. The suspension mounting system according to claim 1, wherein said air spring includes an air spring bellows having a first end secured around said shock absorber and a second end disposed around said air spring mount.

6. A suspension mounting system for a vehicle, said mounting system comprising:
   a shock absorber;
   a shock absorber mount adapted to secure said shock absorber to said vehicle;
   an air spring disposed around said shock absorber, said air spring defining a sealed chamber; and
   an air spring mount disposed around said shock absorber mount, said air spring mount and said shock absorber mount defining said sealed chamber; wherein:
   said shock absorber mount comprises an outer tube adapted to be secured to said vehicle, an inner tube secured to said shock absorber and an elastomeric bushing disposed between said outer and inner tubes.

7. The suspension mounting system according to claim 6, wherein said air spring mount provides pivotal movement with respect to said shock absorber mount.

8. The suspension mounting system according to claim 7, wherein said air spring mount includes a first and a second curved surface for providing said pivotal movement.

9. The suspension mounting system according to claim 8, wherein said first and second curved surfaces are generally spherical.

10. The suspension mounting system according to claim 9, wherein said second curved surface sealingly engages said first curved surface.

11. The suspension mounting system according to claim 6, wherein said second curved surface sealingly engages said first curved surface.

12. The suspension mounting system according to claim 6, wherein said air spring includes an air spring bellows having a first end secured around said shock absorber and a second end disposed around said air spring mount.

13. An upper mounting system for a shock absorber and an air spring of a vehicle, said mounting system comprising:
   an inner tube adapted to be secured to said shock absorber;
   an outer tube adapted to be secured to said vehicle;
   an elastomeric bushing disposed between said inner and outer tubes;
   a bearing inner tube disposed around said outer tube;
   a bearing outer tube disposed around said outer tube;
   a bearing outer tube disposed around said bearing inner tube, said bearing outer tube being adapted to be secured to said air spring; and
   a curved surface interface disposed between said bearing inner tube and said bearing outer tube, said curved interface allowing pivotal movement of said bearing outer tube with respect to said bearing inner tube.

14. The upper mounting system according to claim 13, wherein said curved interface comprises a first generally spherical surface attached to said bearing inner tube and a second generally spherical surface attached to said bearing outer tube.

15. The upper mounting system according to claim 14, wherein said second generally spherical surface sealingly engages said first generally spherical surface.

16. The upper mounting system according to claim 13, wherein said curved surface interface is adapted to seal pressurized gas for said air spring.

17. The upper mounting system according to claim 16, wherein said curved interface comprises a first generally spherical surface attached to said bearing inner tube and a second generally spherical surface attached to said bearing outer tube.

18. The upper mounting system according to claim 17, wherein said second generally spherical surface sealingly engages said first generally spherical surface.

19. The suspension mounting system according to claim 13, wherein said air spring includes an air spring bellows having a first end secured around said shock absorber and a second end disposed around said air spring mount.

* * * * *